United States Patent [19]

Herdeg et al.

[11] Patent Number: 4,821,657
[45] Date of Patent: Apr. 18, 1989

[54] VIEWING APPARATUS FOR ENTERING COORDINATE DATA IN AN AUTOMATIC SEWING MACHINE

[75] Inventors: Donald F. Herdeg, South Hamilton; John F. Martin, Essex, both of Mass.

[73] Assignee: British United Shoe Machinery Ltd., Leicester, England

[21] Appl. No.: 445,591

[22] Filed: Dec. 3, 1982

[51] Int. Cl.⁴ .......................... D05B 3/14; D05B 79/00
[52] U.S. Cl. ................................. 112/121.12; 362/32; 362/90; 362/263; 362/285
[58] Field of Search ..................... 362/32, 90, 23, 28, 362/89, 285, 263; 112/308, 309, 457, 121.12, 121.11

[56] References Cited

U.S. PATENT DOCUMENTS

| | | | |
|---|---|---|---|
| 3,072,081 | 1/1963 | Milligan et al. | 112/308 X |
| 3,130,633 | 4/1964 | Räntsch | 362/89 X |
| 3,352,263 | 11/1967 | Adams et al. | 112/121.12 |
| 3,636,341 | 1/1972 | Miller | 362/263 |
| 4,011,403 | 3/1977 | Epstein et al. | 362/32 X |
| 4,072,114 | 2/1978 | Sugiyama et al. | 112/121.12 |
| 4,226,197 | 10/1980 | Pollmeier et al. | 112/308 X |

FOREIGN PATENT DOCUMENTS

| | | | |
|---|---|---|---|
| 107692 | 10/1927 | Austria | 362/90 |
| 1151167 | 7/1963 | Fed. Rep. of Germany | 362/90 |

Primary Examiner—John S. Maples

[57] ABSTRACT

Viewing apparatus is disclosed for use with an automatic sewing machine in digitizing patterns that are to be sewn. The viewing system includes a high intensity light projection device mounted close to the head of the sewing machine. The mounting of the projection device includes adjustment capabilities which allow a projected image to be centered on a point having a predefined relationship with respect to the sewing needle of the automatic sewing machine.

12 Claims, 4 Drawing Sheets

VIEWING APPARATUS FOR ENTERING COORDINATE DATA IN AN AUTOMATIC SEWING MACHINE

FIELD OF THE INVENTION

This invention relates to viewing systems for entering coordinate data defining the operative path of a workpiece relative to a tool. In particular, this invention relates to an optical viewing system within an automatic sewing machine wherein the sewing pattern is to be defined.

BACKGROUND OF THE INVENTION

U.S. Pat. No. 4,136,306 to Westlund et al, entitled, "Apparatus for Preparing Pattern Control Data" discloses an optical viewing system which is utilized for entering pattern data into an automatic sewing machine. The optical viewing system illuminates a portion of a movable X-Y table which allows the operator of the sewing machine to view a model of the desired pattern located on the table. The model of the desired pattern is projected onto a viewing screen having cross hairs thereon. The pattern model is caused to move while under the manual control of the operator. In this regard, the operator positions various points of the pattern relative to the cross hairs so as to define coordinates of the stitch pattern. These coordinates are digitized and thereafter recorded into the memory of a computer associated with the automatic sewing machine.

It is to be appreciated that the illumination provided in the optical viewing system of U.S. Pat. No. 4,136,306 is only for the purpose of illuminating an area that is to be projected onto the viewing screen. The illumination is not itself used as a reference for positioning various points of the pattern.

The image projection system of U.S. Pat. No. 4,136,306 also requires an appreciable offset relative to the sewing needle. This offset is due to the considerable structure associated with the viewing system. The offset dictates how far the positioning system must be extended to the one side of the sewing machine so as to allow for a complete digitizing of a pattern. Typical positioning systems for an automatic sewing machine do not allow for such an appreciable displacement to the one side of the sewing machine. This had led to the mounting of auxiliary holding devices associated with the positioning system so as to thus hold the pattern that is to be digitized to the one side of the sewing machine. This auxiliary holding device has introduced objectionable inaccuracies into the positioning of the thus mounted pattern. This has furthermore added an appreciable amount of time to the digitizing process.

OBJECTS OF THE INVENTION

It is an object of this invention to provide a viewing apparatus which minimizes the displacement of the pattern to be digitized to the one side of the sewing machine.

It is another object of this invention to provide a viewing apparatus which projects a bright, predefined image onto a pattern reference that is to be positioned relative to the image.

It is still another object of this invention to provide a viewing apparatus which projects a bright, predefined image which may be used to define a plurality of spaced sewing patterns relative to a predefined pattern reference.

SUMMARY OF THE INVENTION

The above and other objects are achieved by an optical viewer system that is easily mounted in a close relationship to the sewing head of an automatic sewing machine. The viewer system includes a high intensity light projection device which projects a bright, predefined image on a pattern reference slightly offset from the sewing needle of the machine. The pattern reference is controllably positioned relative to the predefined image so as to allow coordinate positions to be defined to the automatic sewing machine. The mounting of the high intensity light projection device within the viewer system is adjustable so as to allow the projected image to be centered on a point having meaning to the automatic sewing machine. In this manner, the positioning of the pattern reference with respect to the predefined image defines meaningful coordinate positions to the automatic sewing machine.

In accordance with the invention, the projected image comprises a set of concentric circles which allow for the definition of a sewing path relative to a predetermined cut out within a pallet controllably positioned with respect to the image. This concentric circle configuration allows for one or more arbitrarily defined positions of the digitized coordinates relative to the edge of the cut-out.

BRIEF DESCRIPTION OF THE DRAWINGS

The above and other features of the invention will now be particularly described with reference to the accompanying drawings, in which.

DESCRIPTION OF THE PREFERRED EMBODIMENT

Figure 1:
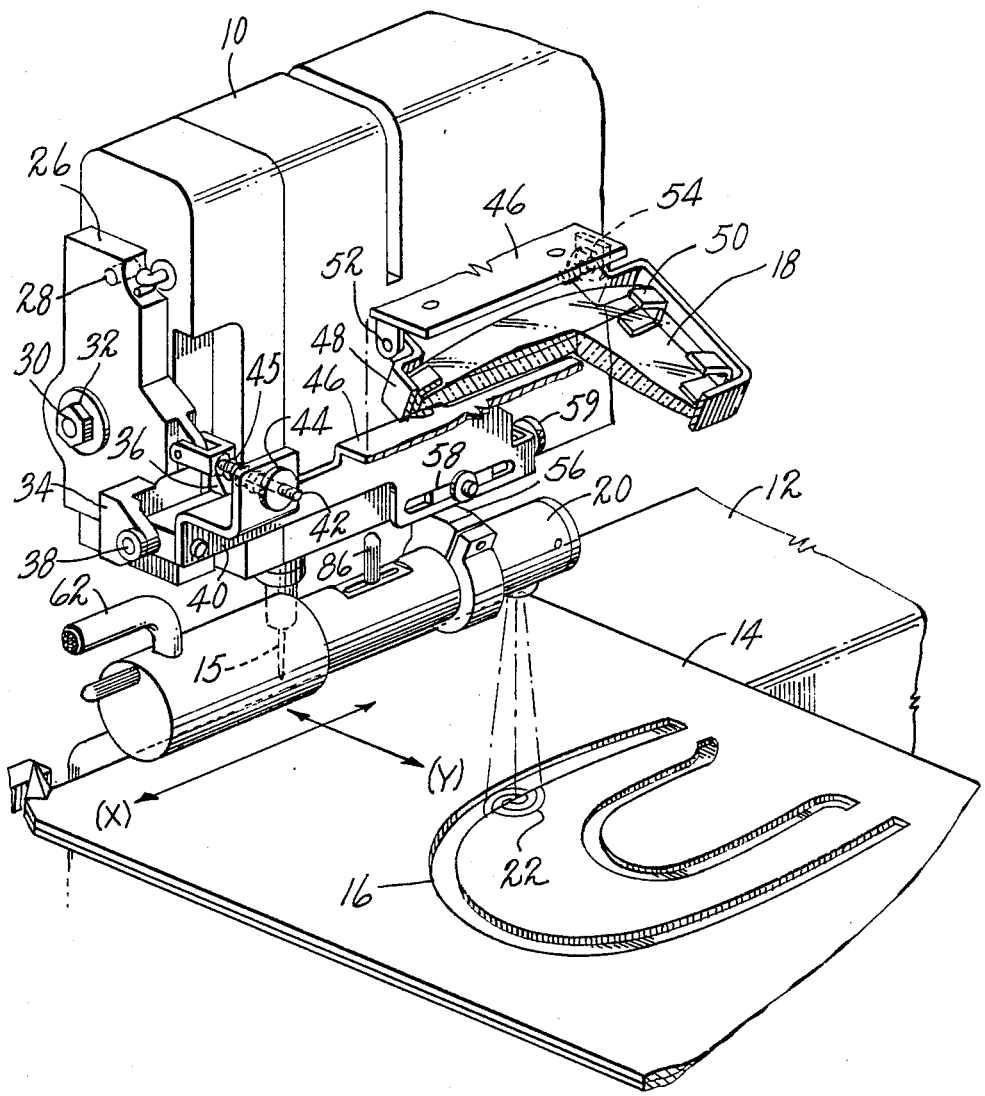
FIG. 1 illustrates the viewing system mounted to the head of a sewing machine.

Referring to FIG. 1, a portion of a sewing machine head 10 is illustrated above a bed 12 of the same sewing machine. The sewing machine head 10 and bed 12 are parts of an automatic sewing machine which automatically sews a workpiece previously located within a pallet 14. The pallet 14 is positioned on the bed 12 relative to a sewing needle 15. The pallet is attached to an X-Y positioning system which moves the pallet 14 in the indicated X and Y directions relative to the sewing needle 15. Sewing machines of the aforementioned type are well known in the art and hence need not be further discussed herein.

The illustrated pallet 14 is of the join and sew type such as is disclosed in U.S. Pat. No. 3,988,993 to Brophy et al. This pallet includes several pieces of work arranged within the pallet. The pallet has openings or cut-outs such as 16 therein to allow for access of the sewing instrumentalities. It is to be assumed that the actual stitch path to be followed within the opening has yet to be defined. The stitch path will at least in part run parallel with the peripheral edge of the opening 16 so as to join the pieces of work together. This stitch path is to be defined to the automatic sewing machine utilizing the viewing apparatus which will now be described.

The viewing apparatus is seen to include a lens 18 pivotally mounted above an illumination device 20 which projects a concentric circle image 22 on the pallet 14. It is to be noted that the projected image is easily viewed through the lens 18 by virtue of the pivotal nature of the lens. In this regard, the lens is preferably pivoted twenty degrees from the horizontal. The center of the lens is further preferably offset 4-6 cm. relative to the center line of the illumination device which allows for a comfortable viewing by the operator.

The lens 18 and the illumination device 20 are mounted to the sewing head 10 by mounting structure which will now be described. The mounting structure includes a face plate 26 which is accurately registered via a pin 28 and a threaded stud 30 to the front of the sewing head 10. A nut 32 threadably engages the stud 30 so as to securely fasten the thus registered face plate 26 to the sewing head 10.

The face plate 26 has a pair of shoulder extensions 34 and 36 which receive a pin 38 that pivotally mounts a structural member 40 thereto. The angular relationship of the structural member 40 to the face plate 26 can be adjusted by virtue of a pivotally attached member 42 which threadably engages an adjustment nut 44. A compression spring 45 biases the structural member 40 against the adjustment nut 44. The structural member 40 may be rotated about the pin 38 so as to establish a desired angular relationship with respect to the sewing head 10.

The structural member 40 has a bracket portion 46 which extends outwardly so as to provide for the pivotal attachment of the lens 18. The lens 18 has a pair of flexible legs 48 and 50 which are spring loaded against pivotal attachment points 52 and 54 on the bracket portion 46. The lens 18 can hence be adjustably rotated about the pivotal attachment points 52 and 54 so as to appropriately view the illuminated image 22.

Figure 2:
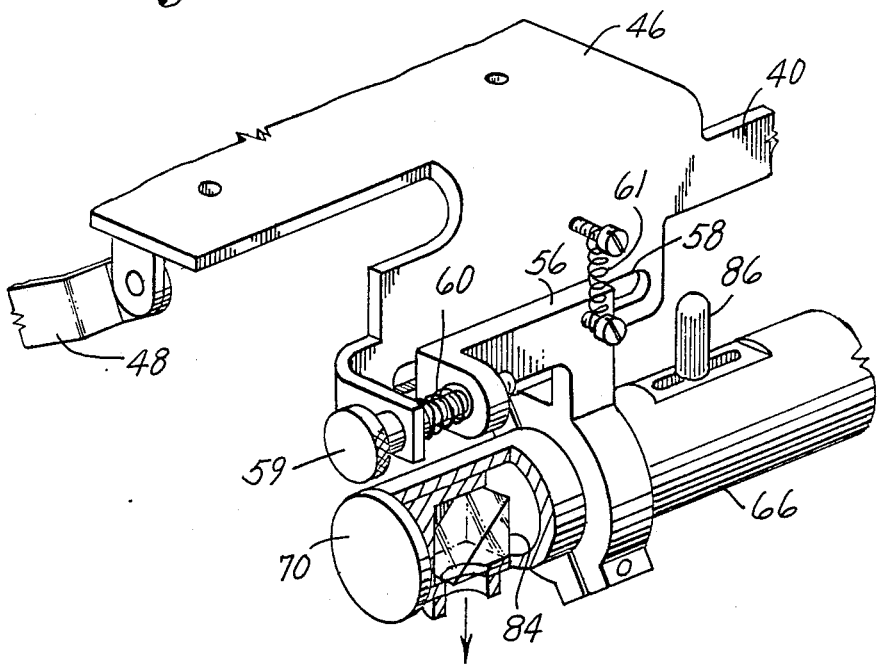
FIG. 2 is a detailed illustration of a portion of the viewing system.

The illumination device 20 is suspended from the structural member 40 via a slidable collar 56. It is to be appreciated that the collar 56 allows the illumination device 20 to be mounted directly under the structural member 40 at only slight distances from the sewing head and the sewing needle. These distances are preferably 0.3 (three tenths) cm from the sewing head and 5 (five) cm from the sewing needle as stated with respect to the centerline of the illumination device 20. The collar 56 slides within a slot 58 in the structural member 40. The position of the collar within the slot is defined by a threadable adjustment member 59 clearly illustrated in FIG. 2. Referring to FIG. 2, it is seen from the inside of the structural member 40, that the threadable adjustment member 59 threadably engages the upper portion of the collar 56. The collar 56 is slidably supported within the slot 58 so as to laterally move in response to a finger rotation of the head of the threadable adjustment member 59. A compression spring 60 provides a positive bias to the laterally movable collar 56. A tension spring 61 eliminates any vertical movement of the collar 56 within the slot 58.

Referring again to FIG. 1, it is seen that the illumination device 20 receives a high intensity light over a fiber optic cable 62. The high intensity light source for the fiber optic cable is preferably a remotely located halogen light which is not shown in FIG. 1. The high intensity light is processed through the illumination device 20 by internal optics which will be described with reference to FIG. 3.

Figure 3:
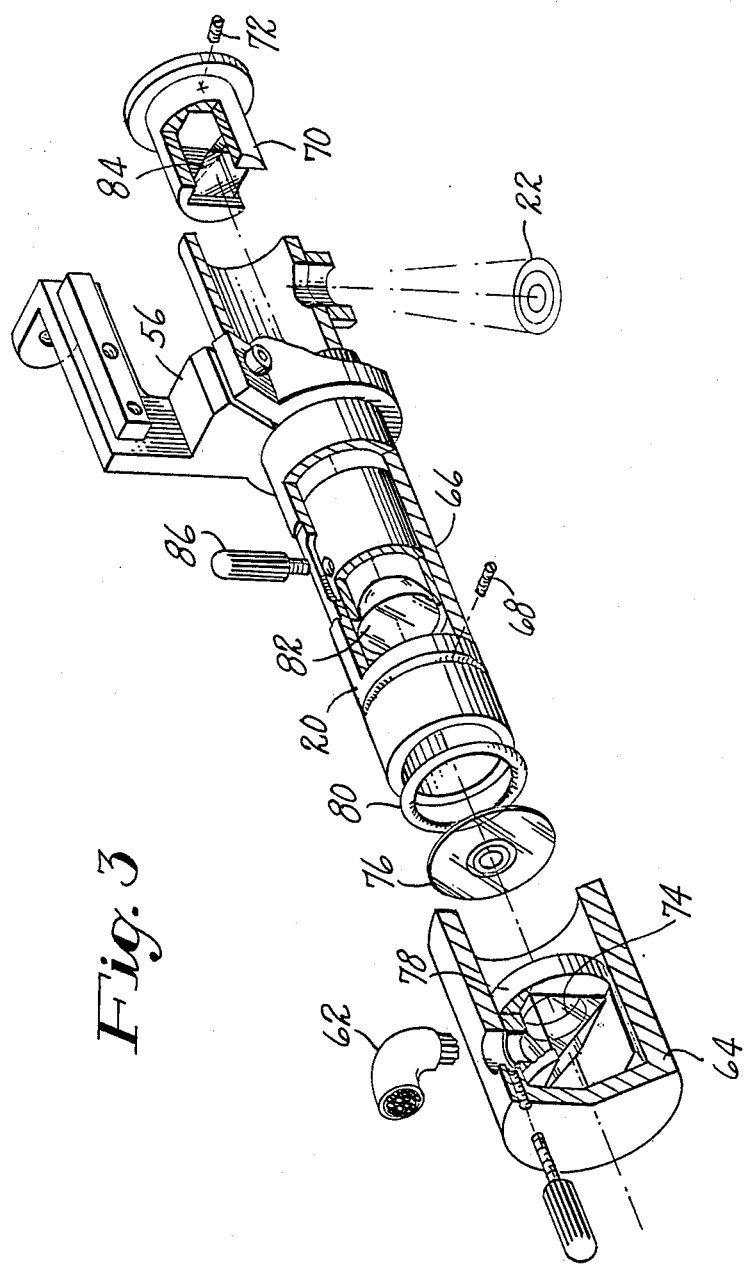
FIG. 3 is an exploded cross sectional view of the illumination device within the viewing system.

Referring to FIG. 3, the illumination device 20 is illustrated in exploded fashion, It is seen that the illumination device comprises an end portion 64 which fits over one end of a middle portion 66 and is secured thereto by a set screw 68. A second end portion 70 fits snugly into the opposite end of the middle portion and is secured thereto by a set screw 72. It is hence to be appreciated that portions of the illumination device 20 are easily disassembled so as to allow access to the internal optics.

The optics are seen to include a prism 74 positioned beneath the fiber optic cable input within the end portion 64. The prism 74 causes the high intensity light from the cable to be projected along the axis of the illumination device 20. A concentric circle pattern image located on a reticle 76 is positioned along the path of the thus projected light. In particular, the center dot of the concentric circle image is located precisely on the axis of the illuminated device. The reticle 76 is positioned against an inner mount 78 within the end portion 64. The reticle 76 is maintained in this position by an "0" ring 80 which is pressed against the reticle by the end of the middle portion 66. The concentric circle image is reduced through a lens 82 before being applied to a prism 84. The reduced image is projected downwardly through the prism 84 onto the pallet 14 so as to form the projected image 22. It is to be noted that the size of the projected image 22 can be changed by a lens adjustment 86 associated with the lens 82. The size of the projected concentric circle image 22 is however preferably maintained at 6 mm for the outer circle, 4.5 mm for the middle circle and 3 mm for the inner circle of the projected image. This allows a precisely defined relationship of radial distances between the concentric circles that can be relied upon when utilizing the apparatus for digitizing.

Figure 4:
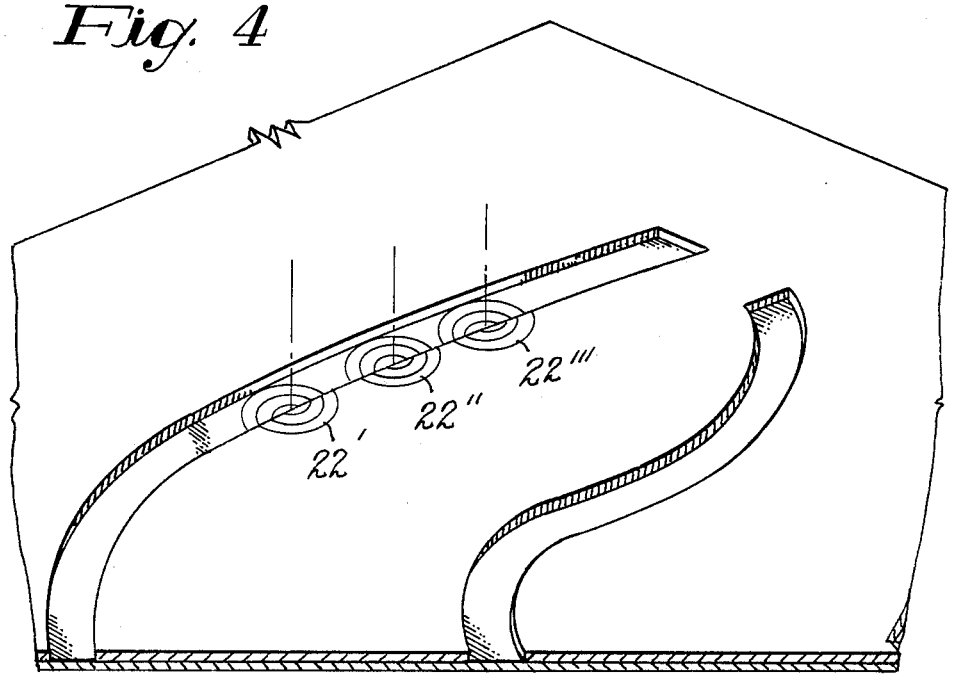
FIG. 4 illustrates successive illuminations which would appear on a manually positioned pallet.

Digitizing of a stitch pattern is accomplished by successively positioning the pallet 14 with respect to the projected image 22. This is preferably accomplished by a manual toggle switch arrangement such as is disclosed in U.S. Pat. No. 4,136,306 to Westlund et al. The toggle switch defines motion in both the X and Y directions. The successive positions of the pallet 14 are illustrated in FIG. 4. It is to be noted that the pallet 14 is in each instance positioned so that the outer concentric circle of the projected images 22, 22' and 22" is tangent to the edge of the opening 16. This will result in the center of each projected image 22 being at a predefined distance away from the edge. It is to be noted that middle or the inner concentric circle of the projected image could also be used as the tangent reference. This would result in the center of the projected image being closer to the edge of the opening 16. The center of the image will constitute in each instance the relevant coordinate that is digitized as will now be explained.

Figure 5:
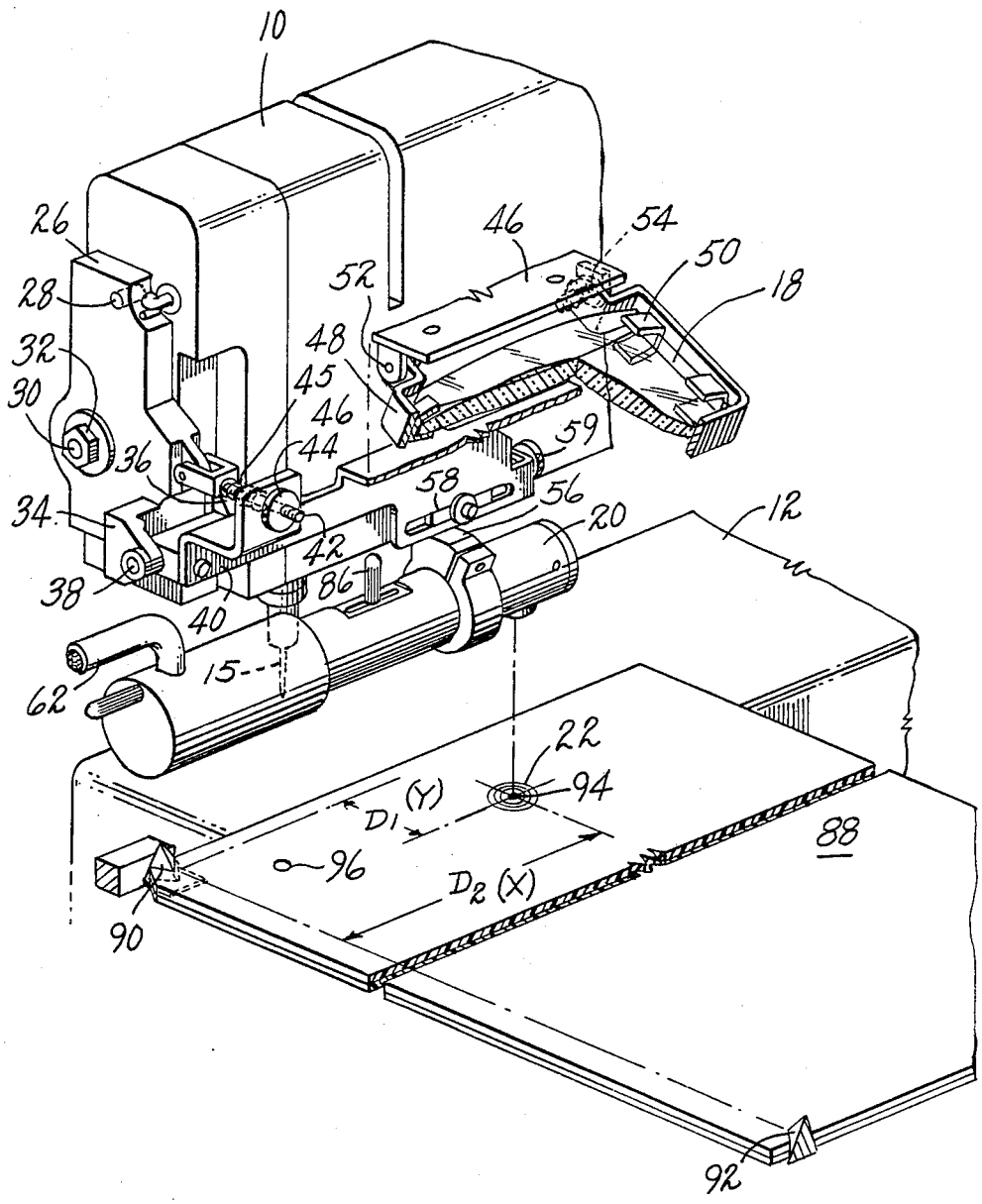
FIG. 5 illustrates the adjustable alignment of the viewing system.

It will be remembered that the position of the structural member 40 with respect to the sewing head 10 is governed by the nut 44 and the threaded member 42. This adjustment allows for a lateral movement of the illumination device 20 in the Y-direction with respect to the sewing machine head. The illumination device 20 is also capable of being moved lengthwise in the X-direction with respect to the sewing machine head 10. This is accomplished by rotating the threadable adjustment member 59. Adjustments in the X and Y directions allow a projected image from the illumination device to be centered relative to a point in space having meaning to the automatic sewing machine. The adjustments are preferably accomplished with respect to a predefined spot on a calibration pallet 88 that has been connected to the X-Y positioning system as is shown in FIG. 5. The connection to the X-Y positioning system is by virtue of a pair of wedges 90 and 92 which engage matching inserts within the pallet 88. Such a pallet connection to an X-Y positioning system is disclosed in U.S. patent application Ser. No. 266,298, now U.S. Pat. No. 4,479,446 entitled "Sewing Machine Having Automatic Identification and Processing of Work", filed on May 22, 1981 in the names of Johnson et al. It is to be noted that many different approaches have been taken to connecting pallets to X-Y positioning systems and the above is merely one example of one such pallet connection. A predefined set of X and Y commands to the positioning system will move the calibration pallet 88 underneath the illumination device 20 as is shown in FIG. 5. A point 94 located at prescribed distances $D_1$ and $D_2$ from the connection points of the thus positioned pallet 88 can now be used to finely adjust the viewing apparatus. In this regard, the light source for the fiber optic cable 62 is activated so as to project the concentric circle image 22 onto the thus positioned pallet. The illumination device 20 is then adjusted in the Y-direction via the adjustment nut 44 and in the X-direction via the adjustment member 59. These X and Y adjustments bring the center dot of the concentric circle image 22 into precise alignment with the predefined point 94. The center of the projected image 22 will be at a prescribed offset distance relative to the sewing needle within the sewing head 10. This prescribed offset distance arises out of the fact that the X-Y positioning system of an automatic sewing machine is initially calibrated relative to the sewing needle 15. This type of calibration is well known in the art and need not be discussed in detail herein. It is however to be understood that a calibration hole such as 96 in the calibration plate 88 is usually brought into alignment with respect to the sewing needle 15. The particular X,Y positional commands necessary to obtain such an alignment are maintained as a reference within the control portion of the automatic sewing machine. Any difference in the position of the calibration hole 96 on the pallet 88 relative to the point 94 can be maintained as a secondary reference. This secondary reference can be used to define a set of adjusted X, Y positional commands which would cause the point 94 to be positioned directly underneath the needle 15. The difference between the thus adjusted positional commands for the point 94 to be underneath the needle 15 and that of the predefined set of X and Y commands for the point 94 in FIG. 5 constitutes the prescribed offset distance. In other words, the center dot of the image 22 aligned with respect to the point 94 in FIG. 5 will be at the prescribed offset distance relative to the needle 15. It is to be appreciated that each coordinate position that is thus defined during the digitizing process of FIG. 4 will be redefined relative to the sewing needle 15 by the prescribed amount of offset. This is easily accomplished within control systems of automatic sewing machines.

It is to be appreciated that the viewing apparatus need only be adjusted when it is initially mounted to the sewing head 10. Once the adjustments have been made, the center dot of the projected image 22 should continue to have the prescribed meaning to the automatic sewing machine. This can of course be periodically checked from time to time by issuing the predefined set of X and Y commands so as to thereby position the calibration pallet 88. The point 94 should coincide with the dot of the concentric circle image.

It is to be appreciated that while a join and sew pallet has been heretofore referenced, it is also possible to us other work holding arrangements such as an open pallet for decorative stitching. In this regard, the viewing apparatus can be used with any work holding arrangement that is connected to the X-Y positioning system can be used with the viewing apparatus. The center of the projected image 22 will always occur at the same predefined offset relative to the sewing needle. In this regard, a decorative pattern can be held within for instance an open pallet which is thereafter preferably moved under toggle control so as to successively position the points of the decorative pattern with respect to the center of the projected image 22. In this case, points on the decorative pattern will be digitized for subsequent use in defining a stitch path relative to the sewing needle.

It is to be appreciated from the foregoing that a preferred embodiment of a viewing apparatus for use in digitizing stitch patterns has been disclosed. The specific structure of this preferred embodiment may be changed or altered without departing from the scope of the invention.

What is claimed is:

1. Apparatus for optically projecting a predefined image onto the surface of a stitch pattern reference being held within a workholding device of an automatic sewing machine, said apparatus comprising:
   means, attached to the sewing head, for defining the image that is to be projected;
   means for projecting a high intensity light beam through said means for defining the image, said means for projecting a high intensity light beam comprising a halogen light source, and a fiber optic cable connected to said halogen light source for transmitting the light to said means for horizontally projecting a high intensity light beam; and
   means for orienting the projected light beam downwardly onto the surface of the stitch pattern reference after the light beam has been projected through said means for defining the image, whereby the predefined image is projected onto the surface of said stitch pattern reference at a predetermined offset distance from a reciprocating sewing needle associated with said automatic sewing machine.

2. An automatic sewing machine system comprising:
   a sewing head having a reciprocating sewing needle which extends therefrom:
   a moveable workholding device for holding workpieces that are to be sewn, said workholding device being automatically positioned relative to said reciprocating sewing needle so as to normally have stitch patterns automatically sewn on workpieces located within said workholding device;
   means or referencing a stitch pattern that is to be sewn, said means being located within said workholding device; and
   means for projecting a predefined image onto said means for referencing the stitch pattern whereby the predefined image appears on the surface of said means for referencing the stitch pattern at a predetermined offset distance from said reciprocating sewing needle.

3. The automatic sewing machine system of claim 2 wherein said means for projecting a predefined image onto said means for referencing a stitch pattern comprises:
means, attached to the sewing head of said sewing machine, for defining the image that is to be projected
means for projecting a high intensity light beam through said means for defining the image; and
means for orienting the projected light beam downwardly onto the surface of the stitch pattern reference whereby the predefined image is projected onto the surface of said means for referencing the stitch pattern at the predetermined offset distance from the reciprocating sewing needle.

4. The apparatus of claim 2 further comprising:
means for mounting said projection means close to said sewing head; and
a lens pivotally connected to said mounting means and offset from the mounted position of said projection means whereby the predefined image which is produced by said projection means can be easily viewed.

5. The automatic sewing machine system of claim 2 wherein said means for referencing a stitch pattern includes a reference to the sewing path that is to be sewn on a workpiece and the predefined image appearing on the surface of said means for referencing the stitch pattern ia clearly visible as a distinct predefined image relative to the reference to the sewing path.

6. The automatic sewing machine system of claim 5 further comprising:
manually controlled means for moving the workpiece holder whereby a point on the reference to the sewing path is brought into registration with the predefined image projected on said means for referencing the stitch pattern.

7. The automatic sewing machine system of claim 5 wherein the predefined image comprises a plurality of concentric circles which may be used to define distances relative to the reference to the sewing path on said means for referencing a stitch pattern.

8. The automatic sewing machine system of claim 2 further comprising:
means for mounting said means for projecting a predefined image to said sewing head whereby the predefined image is projected onto the surface of said means for referencing the stitch pattern at the predetermined offset distance from said reciprocating sewing needle.

9. The automatic sewing machine system of claim 8 further comprising:
means for adjusting the mounted position of said means for projecting a predefined image relative to the head of the sewing machine so as to thereby adjustably define the spatial relationship of the projected predefined image relative to the reciprocating sewing needle.

10. The apparatus of claim 8 wherein said means for mounting said projection means to the head of the sewing machine comprises:
a plate which attached to the face of the sewing machine head;
means connected to the plate and extending along the side of said sewing machine head; and
means slidably connected to said means extending along t he side of said sewing machine head for holding said projection means.

11. The apparatus of claim 10 wherein the connection of said means extending along the side of said sewing machine head is adjustable relative to the plate so as to define different positions of said projection means relative to the sewing needle.

12. The apparatus of claim 10 or claim 11 wherein the connection of said means for holding said projection means to said means extending along the side of said sewing machine head is adjustable whereby different positions of said projection means may be established relative to the sewing needle.

* * * * *